Dec. 27, 1966   G. R. ARGUE ETAL   3,295,028
ELECTRICAL DEVICE WITH CLOSELY SPACED ELECTRODES AND
METHOD FOR MAKING SAME
Filed Jan. 17, 1964

INVENTORS
Gary R. Argue
Richard F. Stewart

BY
ATTORNEY

United States Patent Office 3,295,028
Patented Dec. 27, 1966

3,295,028
ELECTRICAL DEVICE WITH CLOSELY SPACED ELECTRODES AND METHOD FOR MAKING SAME
Gary R. Argue, Encino, and Richard F. Stewart, Los Angeles, Calif., assignors to Self Organizing Systems, Inc., Dallas, Tex., a corporation of Texas
Filed Jan. 17, 1964, Ser. No. 338,514
13 Claims. (Cl. 317—230)

The present invention relates to an electrical readout integrator of the solion type. More particularly, it relates to an improved method of manufacturing an electrical readout solion integrator and the product resulting therefrom..

Devices known as "solions" are discussed in detail in the literature, such as, for example, The Journal of Electro Chemical Society, vol. 104, 12 (December 1957, pp. 727–730), and Yale Scientific Magazine, vol. XXXII, 5 (February 1958). Although the solions can be used for many purposes, they are of prime importance when used as an electrical readout integrator. One example of such an integrator is described in the Estes Patent No. 3,021,-482. The electrical readout integrator consists of four electrodes, which are common, readout, shield and input electrodes. The common and readout electrodes are spaced very close together, the shield electrode is spaced from the readout electrode opposite the side of the common electrode, and the input electrode is spaced from the shield electrode opposite the side of the readout electrode. The system is divided essentially into three compartments with the input electrode located in an input compartment, the common and readout electrodes defining an integral compartment, and the shield electrode forming the boundary between a third compartment called the shield-readout compartment and the input compartment, the shield-readout compartment separating the input and integral compartments. The compartments or system is filled with an electrolytic solution which is a reversible redox system as noted in the above publications, with the electrolytic solution serving to provide electrical continuity between the various compartments. The electrolytic solution is suitably an iodine, potassium-iodide aqueous solution, although other solutions can be used. The reservoir compartment is the largest, the integral compartment is made very small and the shield-readout compartment serves only to separate the input compartment from the integral compartment. The shield and input electrodes are suitably separated by a very small orifice to reduce the shield current by reducing diffusion of ions from the input electrode to the shield electrode.

The tetrode system can be considered three interconnected solion diode systems. The first uses the input and common electrodes to transfer iodine between the input and the integral compartments as a function of input current resulting from a current source being connected between the two electrodes. The second uses the readout and common electrodes to produce an output current proportional to the amount of iodine in the integral compartment. The third uses the input and shield electrodes to prevent iodine diffusion between the input and integral compartments. Thus the output current is a measure of the integral of the input current.

In order that an equilibrium distribution of iodine can be reached quickly in the integral zone, which will also increase the frequency response of the device, the integral zone or compartment must be made very small. This can be accomplished by physically locating the common and readout electrodes very close together, which implies that the diffusion time of ions between the two electrodes will be short. Moreover, it can be shown that the sensitivity of the integrator increases as the spacing between the common and readout electrodes is decreased. These electrodes are characteristically relatively large surface plates which, in itself, creates difficulties in the process of physically locating the plates in close proximity. Prior attempts to solve this problem of close electrode spacing has included such techniques as the use of diamond chips spaced on the surface of one of the electrodes with the adjacent electrode resting on the chips. Another technique has been the use of insulating spacers such as disks. The disadvantages to these attempts are apparent, such as the lack of uniform spacing over the entire areas of the electrodes and the physical limit on the minimum spacing that can be achieved.

The present invention provides a method, and a unique device resulting therefrom, for closely spacing adjacent electrodes, the distance of separation between which has been heretofore unattainable. At the same time, complete uniformity of spacing between the electrodes is achieved. This is accomplished by evaporating, or depositing by any other suitable means, a coating of a substance onto the surface of one of the electrodes, placing the other electrode in contact with the coating of the substance, fabricating the device with the electrodes in this configuration such that the electrodes are now permanently held in place, and dissolving the deposited substance from between the electrode plates. The substance is preferably selected so that it will be dissolved by the electrolytic solution used in the solion device when the electrolytic solution is added thereto during the manufacturing process. In addition, the substance is such as not to affect in any way the desired operation of the device once it has been dissolved. In this sense, the substance is inert when in solution with the electrolytic solution. It is apparent that this technique and method has advantages over the methods used previously in that a very uniform coating of the substance can be deposited on the electrode by evaporation and other means. Additionally, an extremely thin layer of the substance can be deposited on the electrode. And, finally, when the substance has been dissolved, there is no physical barrier separating the two electrodes.

Other objects, features and advantages will become apparent from the following detailed description of the invention when take in conjunction with the appended claims and the attached drawing in which like reference numerals refer to like parts throughout the several figures, and in which:

Figure 1:
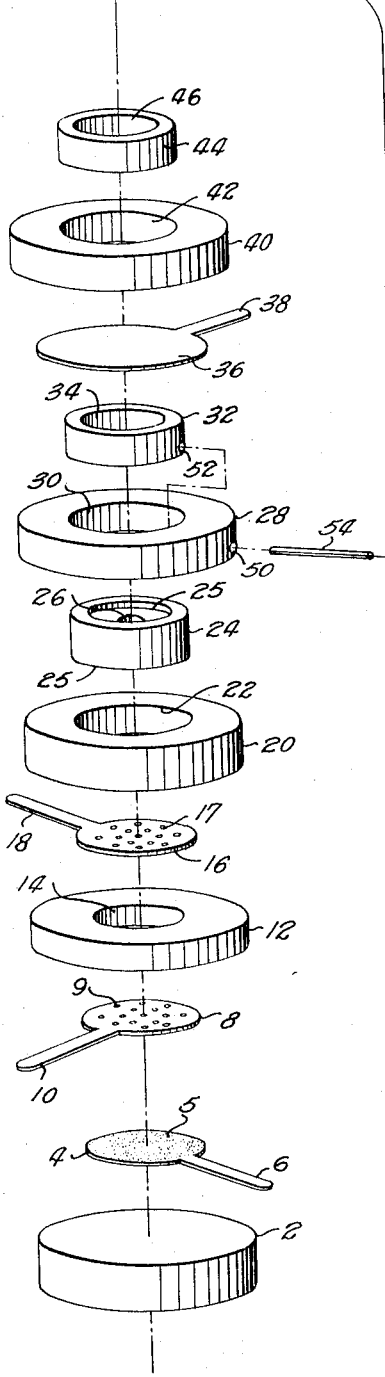
FIGURE 1 is an expanded view of the several component parts of a preferred embodiment of an electrical readout integrator of the solion type of this invention.
Figure 2:
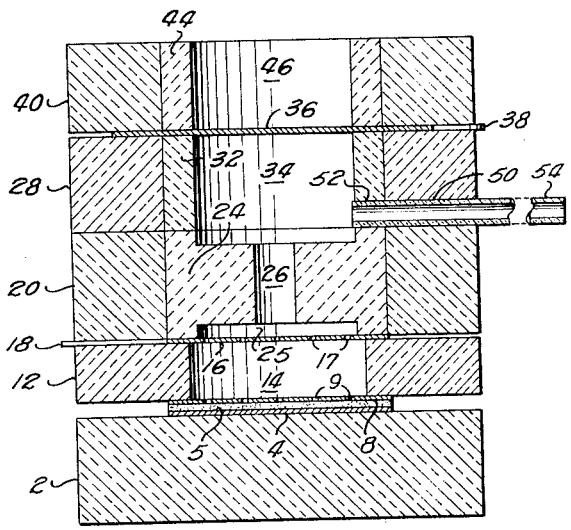
FIGURE 2 is an elevational view in section of the electrical readout integrator of FIGURE 1 when the component parts are placed together.

Referring now to FIGURES 1 and 2, a cylindrical glass preform 2 is used as a platform for the integrator, and four electrodes 4, 8, 16 and 36 are spaced apart and located in the various compartments of the device. The electrode 4, which is the common electrode, has a terminal portion 6 which extends beyond the platform 2 to provide an electrical connection, and a uniform coating of a substance 5, to be described below, is deposited by any suitable means over the entire surface of the electrode 4 to provide the spacing of the integral zone, or the spacing between electrode 4 and the adjacent readout electrode 8. The electrode 8, which is the readout electrode, has a terminal portion 10 and is mounted directly on the surface of the substance 5. The terminal portion 10 is positioned at approximately 90° to the terminal portion 6 for convenience of external electrical connections. Suitable perforations 9 are provided in the electrode 8 to allow the electrolytic solution to pass into the integral zone between electrodes 4 and 8. A glass washer 12 with an aperture 14 slightly smaller than the electrode 8 is placed on the top of the latter and is used as a spacer to separate the readout and shield electrodes. Another electrode 16, which is the shield electrode, has a terminal portion 18 and is placed on top of the glass washer 12 with its terminal portion extending approximately 90° to both terminal portion 6 of electrode 4 and terminal portion 10 of electrode 8. Perforations 17 are also provided in the shield electrode to allow the electrolytic solution to pass therethrough. Another glass washer 20 having an aperture 22 slightly smaller than the shield electrode 16 is placed on top of the shield electrode, and a ceramic insert 24, having recesses 25 at both ends with a small aperture 26 therethrough, is inserted in the aperture 22 of the washer 20. The washer 24 serves as a small capillary for separating the input electrode from the shield electrode mentioned above, wherein the aperture 26 is small enough to significantly reduce diffusion of ions between the input and shield electrodes and thereby reduce the shield current. Another glass washer 28 with an aperture 30 is fitted down on top of the washer 20, and a ceramic insert 32 with aperture 34 is fitted inside the aperture 30 of washer 28. The input electrode 36 with terminal portion 38 is placed on top of the washer 28, and a glass washer 40 with aperture 42 is placed on top of the electrode with a ceramic insert 44 with aperture 46 fitted inside aperture 42. The glass washer 28 and ceramic insert 32 are additionally provided with holes 50 and 52, respectively, through their sides to accommodate a tube 54 for filling the compartments of the device with an electrolytic solution, to be described below. Once all the components have been placed together, they are heated to the softening point of glass to fuse the parts together and to provide a sealed, unitary structure. The various ceramic inserts are used throughout the device to maintain the desired shape and separations within the device during the heating process. When assembled, the input electrode 36 which terminates the input compartment serves as a bellows to permit the volume of the device to change as the volume of the solution changes responsive to variations in ambient temperature. The ceramic member 44 is provided only in that it prevents the glass forming over the exposed upper surface of electrode 38 when the glass is melted.

The thickness of the substance 5 between the common and readout electrodes has been greatly exaggerated in FIGURE 2 for purposes of illustration. The substance is deposited onto the surface of the common electrode 4 preferably by evaporation, whereby the thickness and uniformity can be very accurately controlled. Evaporation techniques are well known and, therefore, will not be described in detail here. It should be noted, however, that coatings of extreme thinness are easily provided, and can be achieved with uniformity below .0001 inch with ease.

Figure 3:
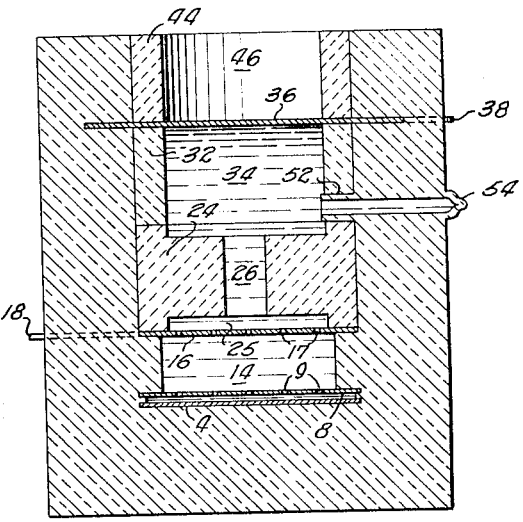
FIGURE 3 is an elevational view in section of the completed integrator after all component parts have been sealed together and the separating substance between the common and readout electrodes has been dissolved.

As described earlier, the integrator is sealed after all components have been assembled together as shown in FIGURE 2. The integrator is sealed by a heating operation at a temperature sufficiently high to cause the glass components to soften and seal together. The sealing temperature depends upon the particular glass used which can be any of several varieties. It can be seen that if such a heating operation is used, the substance 5 must have a melting point in excess of the sealing temperature. Once the sealing has been completed, all electrodes and components are rigidly held in place, and there is, at that time, no longer any necessity for the substance 5 separating the common and readout electrodes. The integrator at this stage is filled with the electrolytic solution 60, and the tube 54 through which the electrolytic solution was admitted is closed off. The substance 5 is dissolved by the electrolytic solution as illustrated in FIGURE 3, which shows the completed device with the substance 5 removed. The relative dimensions of the integrator as shown in FIGURES 2 and 3 are not to scale and have, in certain instances, been greatly exaggerated for purposes of illustration only.

As referred to earlier, the electrolytic solution is suitably an aqueous solution containing preferably iodine and potassium-iodide, although other solutions can be used. The substance 5 is preferably selected to be one which is readily dissolvable in the solution so that the electrolytic solution will effect the removal of the substance from between the common and readout electrodes. Many salts are readily dissolvable in the solutions suitable for use in solion type devices and can be evaporated or sputtered on the electrode 4 to provide the necessary separation. As will be presently described, several salts are satisfactory for this purpose, and it is to be understood that those familiar with the chemical field will readily recognize many substances that have the necessary melting point and which can be dissolved in the electrolytic solutions.

Since the substance 5 is dissolved in the electrolytic solution, it must be inert and not enter into any reaction that would affect the operation of the device. As previously noted, the electrolytic solution is a redox system, and the operation of the integrator is sustained on an oxidation-reduction basis. That is to say, the electrolytic solution contains both the oxidized and reduced species of an ion, wherein reduction occurs at the input or negative electrode and an equivalent amount of oxidation occurs at the common electrode. In the case where an aqueous solution of iodine-potassium iodide is used, for example, the potassium-iodide dissolves in water to yield potassium ($K^+$) and iodide ($I^-$) ions. In the presence of the iodide ion, the iodine exists predominantly as the tri-iodide ion ($I_3^-$) from the relation $I_2+I^- \rightleftharpoons I_3^-$. The potassium ions ($K^+$) do not take part in any reaction. In the reaction the $I_3^-$ ions are reduced to $3I^-$ at the input electrode, and the $3I^-$ are oxidized to $I_3^-$ at the common electrode. It can be seen that any substantial oxidation or reduction of the substance 5, when dissolved in the redox electrolytic solution system, will increase or decrease the amount of iodine, which will affect the operation of the device. Thus the substance 5 must be a salt or other composition which will neither be oxidized by the iodine, reduced by the iodide nor be oxidized or reduced at any of the electrodes to an extent that will ruin the device, although some of the aforementioned reactions will occur with most substances. By insuring that these requirements are met, the substance 5 will be inert to the redox system in so far as the electro-chemical operation of the device is concerned.

The substance 5 can be comprised of any suitable compound, composition, mixture, etc., that meets the foregoing requirements. Recapitulating, the substance must have a melting point in excess of the sealing temperature if the integrator is sealed in a heating operation, must be dissolvable in the electrolytic solution and must be substantially inert once dissolved. The salts of some metals are especially suitable for this purpose, and it has been found that barium-chloride, $BaCl_2$, is a preferred salt which has a melting point between 925° C. and 962° C., is capable of being dissolved by the electrolytic solution and is substantially inert therein. Other salts of barium and of calcium, magnesium, sodium, aluminum, etc., are also suitable. In this connection, it should be noted that such salts are familiar to those in the chemical arts and their properties and characteristics are well enough known that their suitability for use with the present invention can be readily predicted. Thus a more detailed enumeration of all the salts will not be given here. Moreover, substances other than salts can undoubtedly be predicted with ease, and such substances which are suitable are contemplated to fall within the scope of the invention.

It will be readily seen from the foregoing description that the invention has advantages heretofore unattainable in the close spacing of the common and readout electrodes of a sodion integrator. Moreover, the method of achieving this close spacing is deemed applicable to other arts where similar requirements prevail. In addition, certain modifications and substitutions that do not depart from the true scope of the invention will become apparent to those skilled in the art, and it is intended that the invention be limited only as defined in the appended claims.

What is claimed is:

1. A method of manufacturing a solion device having a pair of closely spaced electrodes and an enclosure containing a fluid electrolyte, said enclosure to be comprised of a plurality of components which are heat sealable together when heated to their softening temperature, comprising the steps of:
    (a) depositing a solid coating of a material which is dissolvable in said electrolyte and which has a melting temperature in excess of said softening temperature onto the surface of one of said pair of electrodes,
    (b) placing the other of said pair of electrodes on the exposed surface of said coating having said coating define the spacial relationship between said pair of electrodes,
    (c) assembling said plurality of components to form said enclosure with said pair of electrodes engaged between two of said components,
    (d) heating said plurality of components to at least said softening temperature to seal said components together and to fix said pair of electrodes in their respective positions, and
    (e) filling said enclosure with an electrolyte which contacts the electrodes and dissolves the solid coating material between said pair of electrodes forming a compartment therebetween; and
    (f) sealing said enclosure for retaining the electrolyte therein.

2. A method according to claim 1 wherein said material is neither oxidized nor reduced by said electrolyte.

3. A method according to claim 1 wherein said electrolyte is an aqueous solution, and said material is dissolvable in water.

4. A method according to claim 1 wherein said electrolyte is an aqueous solution containing iodine and iodide ions, and said material is $BaCl_2$.

5. A method according to claim 1 wherein said solid coating of said material is deposited on the surface of said one of said pair of electrodes by evaporation of said material.

6. A method of manufacturing an enclosed electrical device containing an electrolyte and electrodes therein comprising the steps of:
    (a) depositing a solid coating of a material which is dissolvable in the electrolyte onto a surface of one of the electrodes;
    (b) placing a second electrode on the exposed surface of said coating having the coating define the spacial relationship between the first and the second electrodes;
    (c) positioning the first and second electrodes in fixed relationship within an enclosure having a chamber;
    (d) filling said chamber with an electrolyte which contacts the first and second electrodes in said chamber and dissolves the solid coating material between said first and second electrodes forming a compartment therebetween; and
    (e) closing said enclosure for retaining the electrolyte in said chamber.

7. A method according to claim 6 wherein said material is evaporated onto said electrode surface.

8. A method of manufacturing an enclosed electrical device containing an electrolyte and electrodes therein comprising the steps of:
    (a) depositing a solid coating of a material which is dissolvable in the electrolyte onto a surface of one of the electrodes;
    (b) placing a second electrode on the exposed surface of said coating having the coating define the spacial relationship between the first and second electrodes;
    (c) assemblying the electrodes of said device, including the first and second electrodes, in position with the parts of an enclosure having a chamber and composed of heat-softenable insulating material;
    (d) heating the assembly for softening the material of said enclosure for fusing the walls of the parts together into intimate engagement with each other and the electrodes;
    (e) cooling the assembly whereby the enclosure solidifies into a unit containing the electrodes sealed in the walls thereof and exposed in fixed position in the chamber;
    (f) filling said chamber with electrolyte which contacts the electrodes in said chamber and dissolves the solid coating material between said first and second electrodes forming a compartment therebetween; and
    (g) closing said enclosure for retaining the electrolyte in said chamber.

9. A method according to claim 8 wherein said material has a melting point in excess of said softening temperature.

10. A method according to claim 8 wherein said material is evaporated onto said electrode surface.

11. An electrolytic device comprising:
    (a) a container having a chamber therein;
    (b) an electrolytic solution within said chamber comprising reversibly oxidizable and reducible ions; and
    (c) at least a pair of electrodes in said chamber in fixed, spaced apart relationship defining a compartment located between them within said chamber;
    (d) at least one of said pair of electrodes having passages formed therein to permit flow of said solution between said compartment and the remainder of said chamber;
    (e) said electrolytic solution containing a dissolved material therein with said dissolved material being one that does not react with said oxidizable and reducible ions;
    (f) said dissolved material being dissolved by said solution from the compartment defined by said spaced electrodes and the quantity of said dissolved material being a gauging means for defining the special relationship between the spaced electrodes.

12. An article of manufacture according to claim 11 wherein said enclosure maintains said first and second electrodes fixed in their respective positions.

13. An article of manufacture according to claim 11 wherein said material is $BaCl_2$.

References Cited by the Examiner

UNITED STATES PATENTS

| | | | |
|---|---|---|---|
| 2,890,414 | 6/1959 | Snavely | 317—231 |
| 3,021,482 | 2/1962 | Estes | 317—231 |
| 3,098,182 | 7/1963 | Burnham | 317—230 |
| 3,163,806 | 12/1964 | Estes et al. | 317—231 |

JOHN W. HUCKERT, *Primary Examiner.*